United States Patent
Walenta

(10) Patent No.: US 7,097,206 B2
(45) Date of Patent: Aug. 29, 2006

(54) SEAT BELT-BUCKLE TIGHTENER

(75) Inventor: Ulrich Walenta, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 266 days.

(21) Appl. No.: 10/650,033

(22) Filed: Aug. 28, 2003

(65) Prior Publication Data
US 2004/0135361 A1  Jul. 15, 2004

(30) Foreign Application Priority Data
Sep. 4, 2002   (DE) ................. 102 41 623
Dec. 10, 2002  (DE) ................. 102 58 479

(51) Int. Cl.
B60R 22/46 (2006.01)

(52) U.S. Cl. ................... 280/806; 242/374

(58) Field of Classification Search ........... 280/806, 280/808, 801.2; 180/268; 242/382, 374; 297/480; B60R 22/46, 22/36
See application file for complete search history.

(56) References Cited

U.S. PATENT DOCUMENTS

| 5,066,042 A |   | 11/1991 | Foehl |   |
|---|---|---|---|---|
| 5,097,571 A |   | 3/1992 | Foehl |   |
| 5,219,206 A | * | 6/1993 | Anthony et al. | 297/473 |
| 5,309,611 A |   | 5/1994 | Wier |   |
| 5,313,690 A |   | 5/1994 | Hiramatsu |   |
| 5,364,129 A |   | 11/1994 | Collins et al. |   |
| 5,553,803 A | * | 9/1996 | Mitzkus et al. | 242/374 |
| 5,588,677 A | * | 12/1996 | Kopetzky et al. | 280/806 |
| 5,607,185 A | * | 3/1997 | Isaji et al. | 280/806 |
| 5,634,690 A | * | 6/1997 | Watanabe et al. | 297/480 |
| 5,667,161 A | * | 9/1997 | Mitzkus et al. | 242/374 |
| 5,676,397 A |   | 10/1997 | Bauer |   |
| 5,743,480 A | * | 4/1998 | Kopetzky et al. | 242/374 |
| 5,899,399 A | * | 5/1999 | Brown et al. | 242/374 |
| 5,906,328 A | * | 5/1999 | Hamaue et al. | 242/374 |
| 5,944,350 A |   | 8/1999 | Grabowski |   |
| 6,039,352 A |   | 3/2000 | Wier |   |
| 6,126,241 A |   | 10/2000 | Wier |   |
| 6,155,727 A |   | 12/2000 | Wier |   |
| 6,250,683 B1 |   | 6/2001 | Betz |   |
| 6,264,281 B1 |   | 7/2001 | Dukatz |   |
| 6,676,057 B1 | * | 1/2004 | Maierhofer et al. | 242/374 |
| 6,866,296 B1 | * | 3/2005 | Webber et al. | 280/806 |

FOREIGN PATENT DOCUMENTS

| DE | 41 13 094 A1 | 11/1991 |
|---|---|---|
| DE | 43 19 955 S1 | 1/1994 |
| DE | 42 32 160 A1 | 3/1994 |
| DE | 196 41 227 A1 | 4/1997 |

(Continued)

Primary Examiner—David R. Dunn
Assistant Examiner—Drew J. Brown
(74) Attorney, Agent, or Firm—Foley & Lardner LLP

(57) ABSTRACT

A belt-buckle tightener for a seat belt system in a vehicle, having: a rotatable spindle which is connected to a belt buckle via a draw-in cable; and a drive for rotation of the spindle, as a result of which the draw-in cable is rolled up on the spindle and the belt buckle is moved in the tightening direction, and the drive being integrated in the spindle. Integration of the drive in the spindle reduces the structural space required. In addition, the number of individual parts which are required is reduced since, inter alia, a separate driving spindle is not required. Rather, the spindle for winding up the draw-in cable at the same time forms the driving spindle.

12 Claims, 7 Drawing Sheets

FOREIGN PATENT DOCUMENTS

| | | |
|---|---|---|
| DE | 296 20 297 U1 | 4/1997 |
| DE | 297 06 024 U1 | 9/1997 |
| DE | 297 20 213 U1 | 2/1998 |
| DE | 298 18 655 U1 | 7/1999 |
| DE | 199 50 336 A1 | 4/2000 |
| EP | 0 415 418 A2 | 3/1991 |
| EP | 0 447 762 A1 | 9/1991 |
| EP | 0 588 262 A1 | 3/1994 |
| EP | 0 600 689 A1 | 6/1994 |
| EP | 0 662 408 A1 | 7/1995 |
| EP | 0 673 811 A1 | 9/1995 |
| GB | 2 323 769 A | 10/1998 |

\* cited by examiner

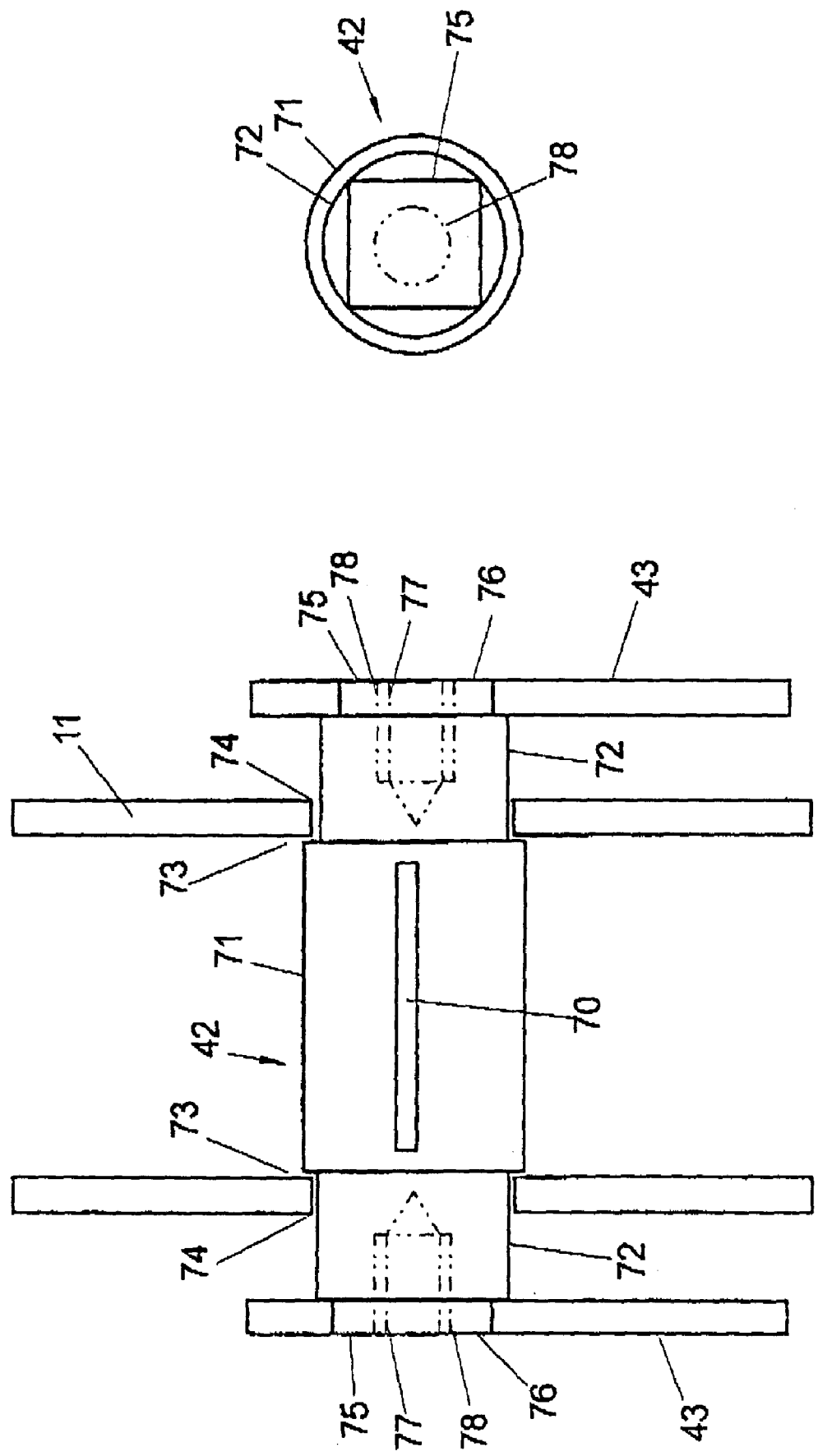

SEAT BELT-BUCKLE TIGHTENER

BACKGROUND

The invention relates to a belt-buckle tightener for a seat belt system in a vehicle.

A belt-buckle tightener is disclosed, for example, in EP-A1-0662408 (incorporated by reference herein). The function of a belt-buckle tightener of this type is based on the fact that a piston which is connected to a belt buckle via a draw-in cable is displaced by means of a pyrotechnic charge in order thereby to tighten the belt in the event of an accident.

A particular disadvantage of a belt-buckle tightener of this type is the structural space which is required for the pyrotechnically driven pistons.

DE-A1-4319955 (incorporated by reference herein) discloses a belt-buckle tightener in which a rotary actuator is used instead of a pyrotechnically driven piston. The rotary actuator is actuated by a pyrotechnic driving unit. In addition, an arresting device in the form of a rack is provided and is intended to prevent the belt buckle from shifting counter to the tightening direction. At any rate, the rotary actuator of this belt-buckle tightener requires less structural space than a pyrotechnically driven piston. Nevertheless, even here the rotary actuator, the pyrotechnic driving unit and the arresting device require a large amount of structural space.

SUMMARY OF THE INVENTION

An object of the present invention is to provide a space-saving belt tightener.

According to the invention, a belt-buckle tightener for a seat belt system in a vehicle is provided, having: a rotatable spindle which is connected to a belt buckle via a draw-in cable; and a drive for rotation of the spindle, as a result of which the draw-in cable is rolled up on the spindle and the belt buckle is moved in the tightening direction, and the drive being integrated in the spindle.

Integration of the drive in the spindle reduces the structural space which is required. In addition, the number of individual parts which are required is reduced since, inter alia, a separate driving spindle is not required. Rather, the spindle for winding up the draw-in cable at the same time forms the driving spindle.

A displacement of the belt buckle is achieved by rotary instead of translatory movement. One advantage of this approach is, in particular, that the structural space required for the belt-buckle tightener is virtually independent of the degree of belt-buckle tightening which is to be produced, but in any case is smaller than with conventional piston devices.

A further advantage is that, in order to form the belt-buckle tightener, components can be used which are also used in belt retractors. The outlay and the costs of developing and producing the belt-buckle tightener are therefore reduced.

In one refinement of the invention, the belt-buckle tightener comprises a coupling sleeve which is connected in a rotationally fixed manner to a frame of the vehicle chassis, the spindle being mounted rotatably on the coupling sleeve, and the drive comprising a gas generator which is fastened to the spindle, and a driving belt, which is fastened at both of its ends to the coupling sleeve and, in the inoperative state of the belt-buckle tightener, is partially wound up on the coupling sleeve and runs around the gas generator, the driving belt thus bounding a space, and gas which is produced by the gas generator flowing into the space, acting upon the driving belt and thereby enlarging the space, as a result of which the driving belt is unwound from the coupling sleeve, produces a driving force and causes the spindle to rotate.

This refinement has the advantage that an integrated spindle drive having a small number of additional components can be produced. In particular, this refinement is also distinguished by a good efficiency ratio with regard to the volume of structural space which is required.

The driving belt, in the inoperative state of the belt tightener, can additionally run around one or more guide elements. The space bounded by the driving belt can be defined as desired by means of the guide elements, in particular in order to optimally convert the energy produced by the gas generator into rotation of the spindle.

In one advantageous refinement, the spindle is coupled to a blocking device which blocks rotation of the spindle counter to the rolling-up direction of the draw-in cable and prevents the draw-in cable from unrolling. The blocking device can be formed by a toothing on the circumference of the spindle and a latch on the vehicle chassis, it being possible for the latch to be brought into engagement with the toothing, and the toothing being designed in such a manner that engagement takes place only when the spindle is rotated counter to the rolling-up direction of the draw-in cable.

Integration of the blocking device on the spindle enables the demand for structural space to be additionally reduced.

In summary, the belt-buckle tightener is therefore distinguished by its compact manner of construction and the possibility of being able to use standard components.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 7 schematically shows the coupling sleeve of the belt-buckle tightener of FIGS. 4 to 6.

DETAILED DESCRIPTION

Figure 1:
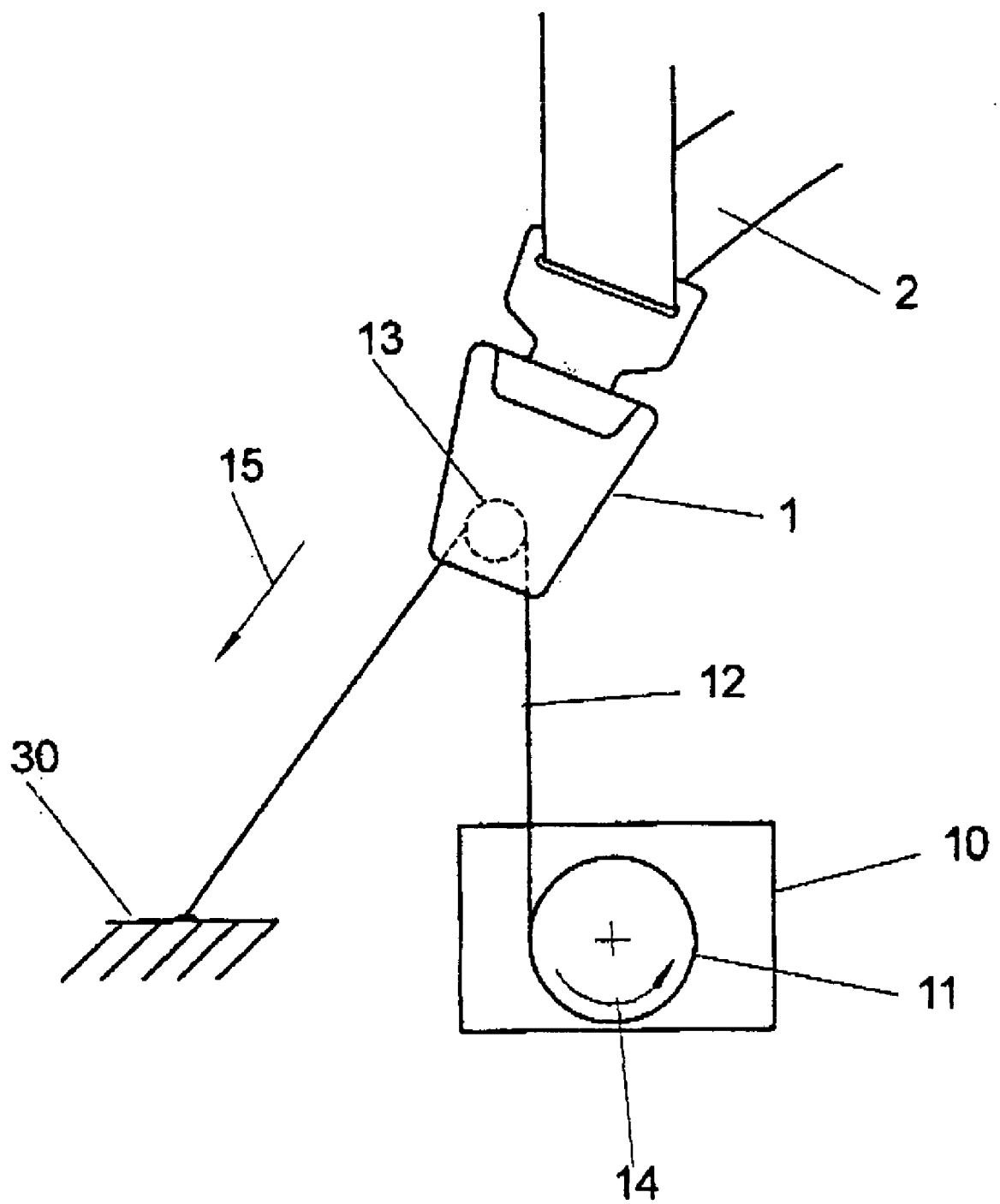
FIG. 1 schematically shows a belt device with a belt-buckle tightener according to a first refinement of the invention.

FIG. 1 schematically shows a belt device with a belt-buckle tightener according to one refinement of the invention. The belt device comprises a belt buckle 1 for securing a belt 2 with respect to the vehicle chassis 30. The belt-buckle tightener comprises a winding-up device 10 which is secured on the vehicle chassis and has a spindle 11 for the rolling up of a (steel) draw-in cable 12 which is secured at one end on the spindle 11 and at the other end on the vehicle chassis 30 or on a frame of the belt-buckle tightener. In between, the draw-in cable 12 runs around a deflection pulley 13 on the belt buckle 1. The deflection pulley 13 is contained in the housing of the belt buckle 1.

FIG. 1 shows the belt-buckle tightener in the non-activated state. In an accident, the spindle 11 is caused to rotate, so that the draw-in cable 12 is rolled up and the belt buckle 1 is displaced towards the securing of the draw-in cable 12 on the vehicle chassis 30. Depending on the design, in particular as a function of the thickness and length of the draw-in cable 12, a guide is provided along which the belt buckle 1 is displaced. The rotation of the spindle 11 is indicated by the arrow 14 and the displacement of the belt buckle 1 is indicated by the arrow 15.

The rotation of the spindle 11 can be triggered, for example, by means of a pyrotechnic charge. The rotation of a spindle by means of a pyrotechnic charge is known as such and therefore does not need to be described more specifically. However, instead of a pyrotechnic charge, other torque-generating devices may also be used.

If, instead of a pyrotechnic charge, an electric torque-generating device is used, the spindle 11 can also be rotated counter to the arrow direction of the arrow 14, which causes the belt buckle 1 to move counter to the arrow direction 15. The tightening process of the belt buckle 1 is then reversible.

In addition, the spindle 11 is provided with a blocking device which prevents it from rotating back (counter to the direction of the arrow 14). Blocking devices of this type are also known as such and therefore not explained further.

Figure 2:
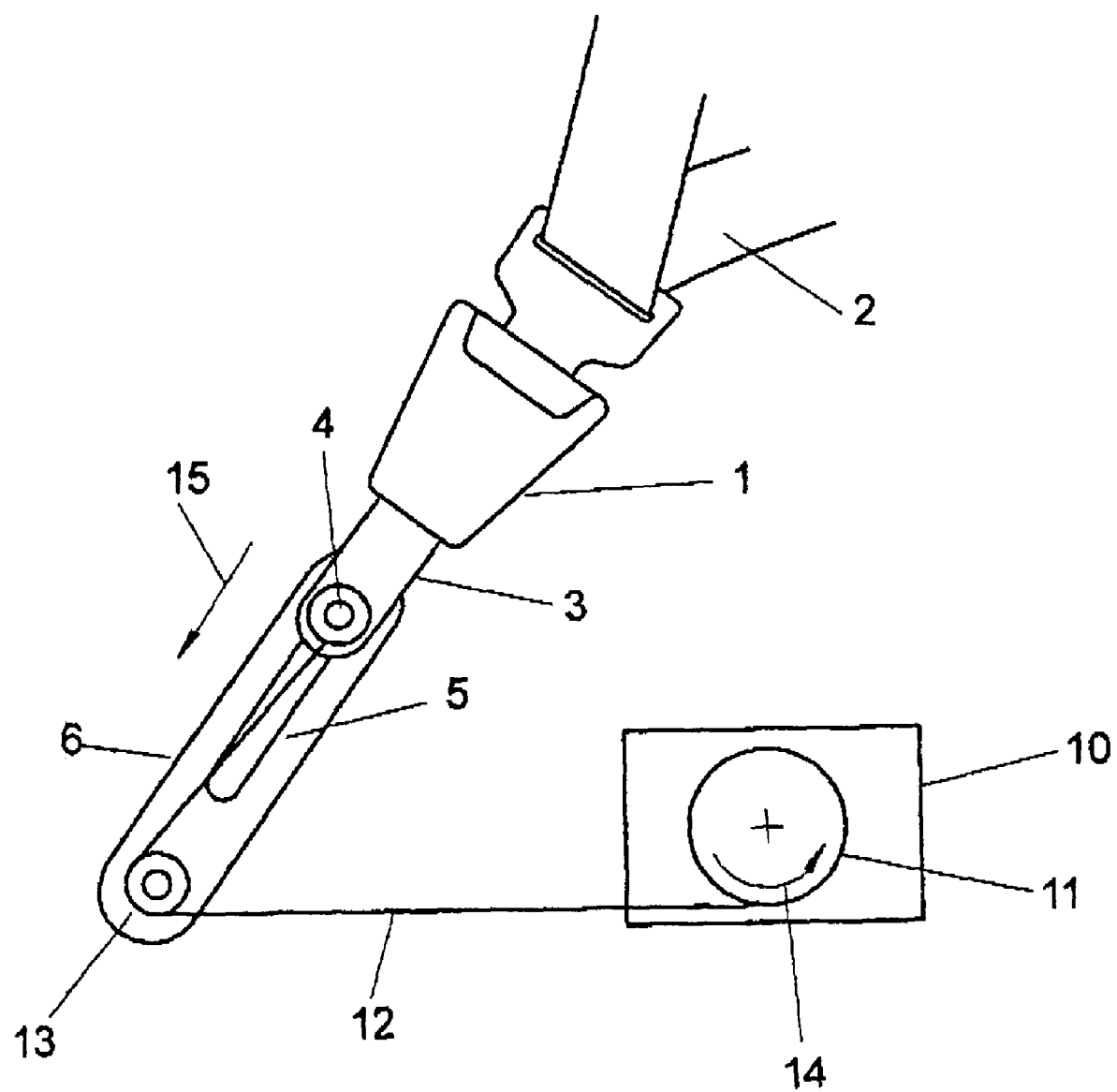
FIG. 2 schematically shows a belt device with a belt-buckle tightener according to an alternative refinement of the invention.

FIG. 2 schematically shows a belt device with a belt-buckle tightener according to an alternative refinement of the invention. The belt buckle 1 is connected here to a fastening fitting 3 whose end which faces away from the belt buckle 1 is mounted displaceably by means of a guide pin 4 in a slot 5 of a securing plate 6. That end of the securing plate 6 which faces away from the belt buckle 1 is fastened to the vehicle chassis.

In this case too, the belt-buckle tightener comprises a winding-up device 10 which is secured on the vehicle chassis and has a spindle 11 for the rolling up of a draw-in cable 12 which is fastened at one end to the spindle 11 and at the other end to the fastening fitting 3. Between the fastening fitting 3 and the spindle 11 the draw-in cable 12 runs around a deflection pulley 13 at that end of the securing plate 6 which is opposite the belt buckle 1.

The function corresponds to that of the belt-buckle tightener from FIG. 1: in an accident, the spindle 11 is caused to rotate, so that the draw-in cable 12 is rolled up and the belt buckle 1 is displaced towards the securing of the securing plate 6 on the vehicle chassis. The rotation of the spindle 11 is also indicated here by the arrow 14 and the displacement of the belt buckle 1 is indicated by the arrow 15.

Figure 3:
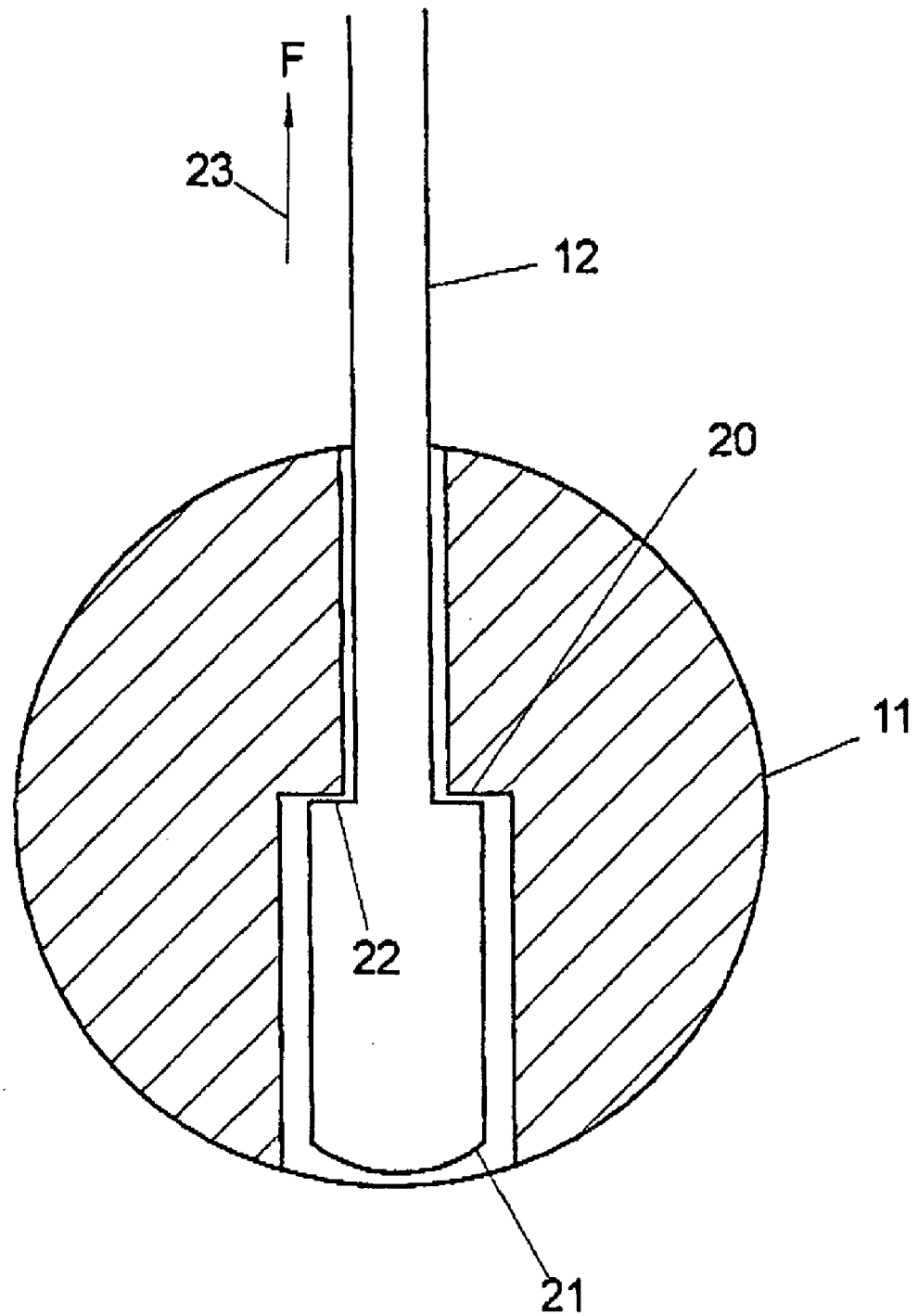
FIG. 3 schematically shows an attachment of the draw-in cable on the spindle according to one refinement of the invention.

FIG. 3 schematically shows a cable attachment according to one refinement of the invention. According to this, the spindle 11 has a radial hole with two sections of different diameter, so that a shoulder 20 is formed in the transition region of the two sections.

At its end provided for fastening to the spindle 11, the draw-in cable 12 has an end piece 21 with a larger cross-sectional surface than the draw-in cable 12. The transition region from the end piece 21 to the cable 12 therefore likewise forms a shoulder 22 which sits on the complementary shoulder 20 in the spindle 11 and, if a tensile force is in action (arrow 23) on the draw-in cable 12, prevents the draw-in cable 12 from being detached from the spindle 11.

Figure 4:
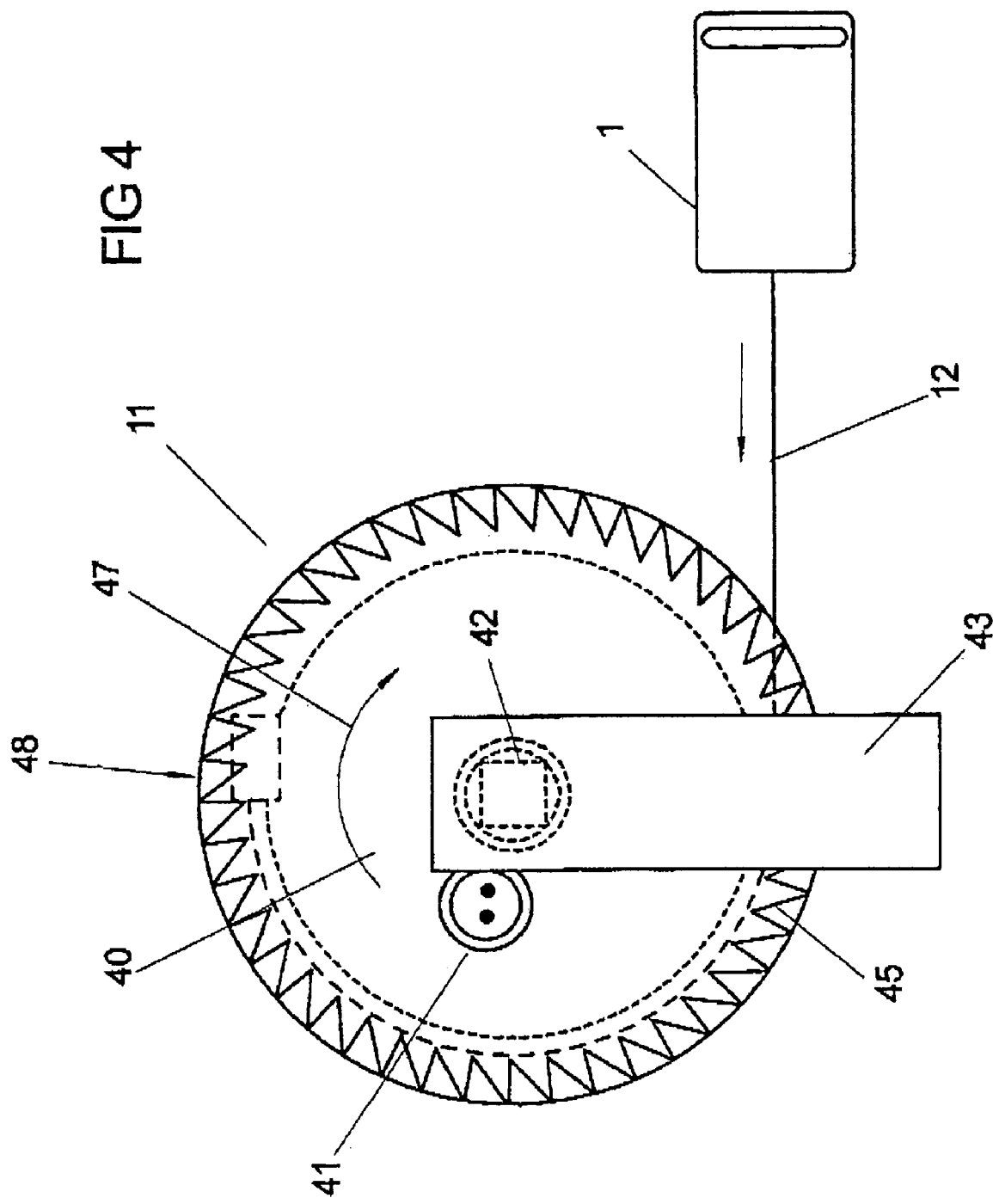
FIG. 4 schematically shows a first view of a belt-buckle tightener according to one refinement of the invention.
Figure 5:
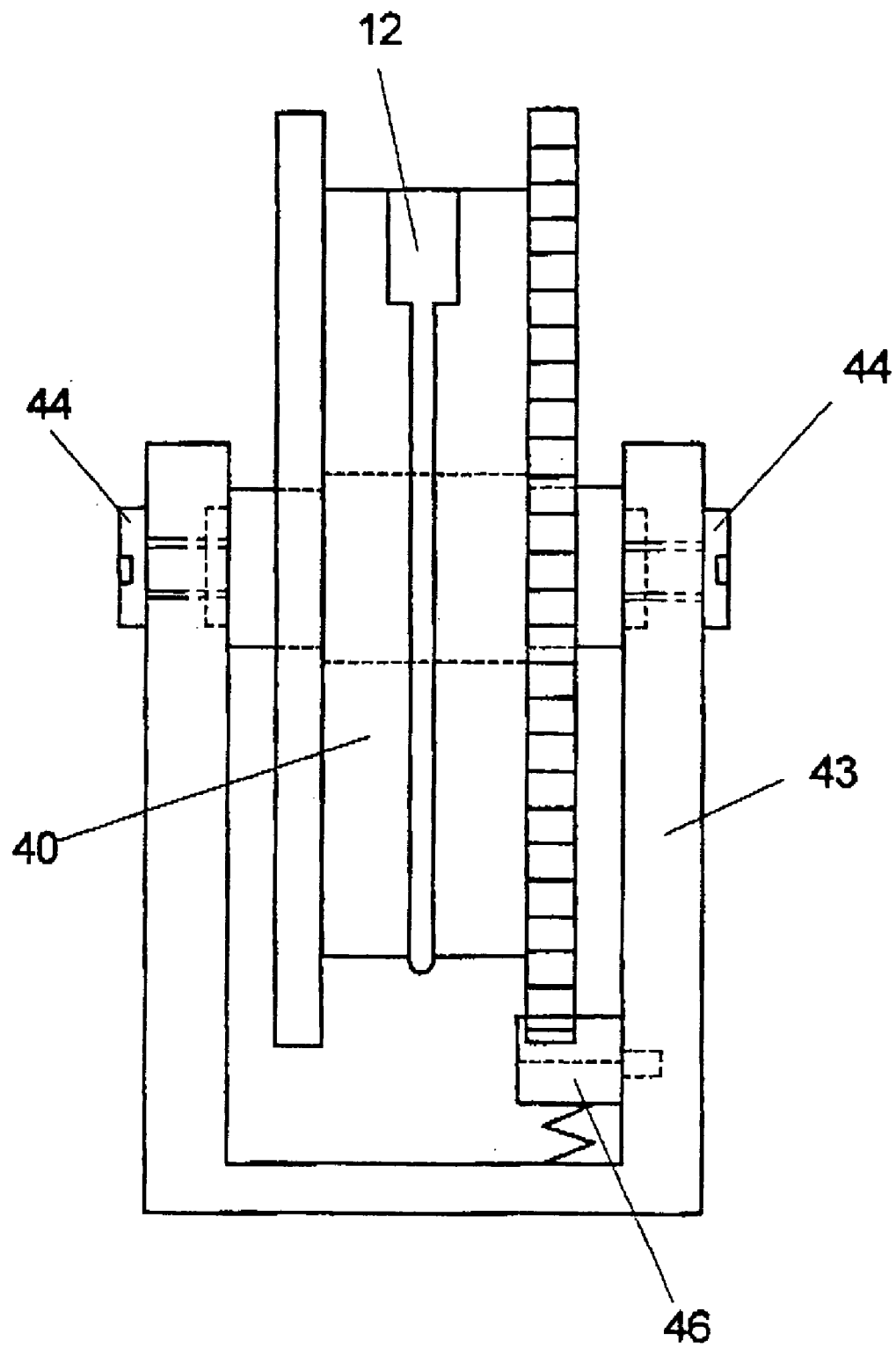
FIG. 5 schematically shows a second view of the belt-buckle tightener from FIG. 4.

FIGS. 4 and 5 show a belt-buckle tightener according to one refinement of the invention. The belt-buckle tightener contains a pyrotechnic drive which is integrated in the spindle 11. For this purpose, the interior of the spindle 11 contains a combustion chamber 40 in which a gas generator 41 is arranged. One refinement of the pyrotechnic drive is described in greater detail further below with reference to FIG. 6.

The spindle 11 is mounted rotatably on a coupling sleeve 42. The coupling sleeve 42 in turn is connected fixedly to a U-shaped frame 43 of the vehicle chassis 30, for example by means of screws 44.

A blocking toothing 45 is provided on the circumference of the spindle 11. Arranged on the frame 43 is a spring-loaded latch 46 which can be brought into engagement with the blocking toothing 45. The teeth of the blocking toothing 45 are angled counter to the direction of rotation 47 of the spindle 11 during the tightening process, so that the blocking latch 46 slides away over the teeth when the spindle 11 rotates in the direction of rotation 47 while, in the reverse direction of rotation, the said blocking latch engages in the blocking toothing 45 and blocks the spindle 11.

The attachment of the draw-in cable 12 on the spindle 11 (reference number 48) is also illustrated and corresponds in principle to the attachment illustrated in FIG. 3.

Figure 6:
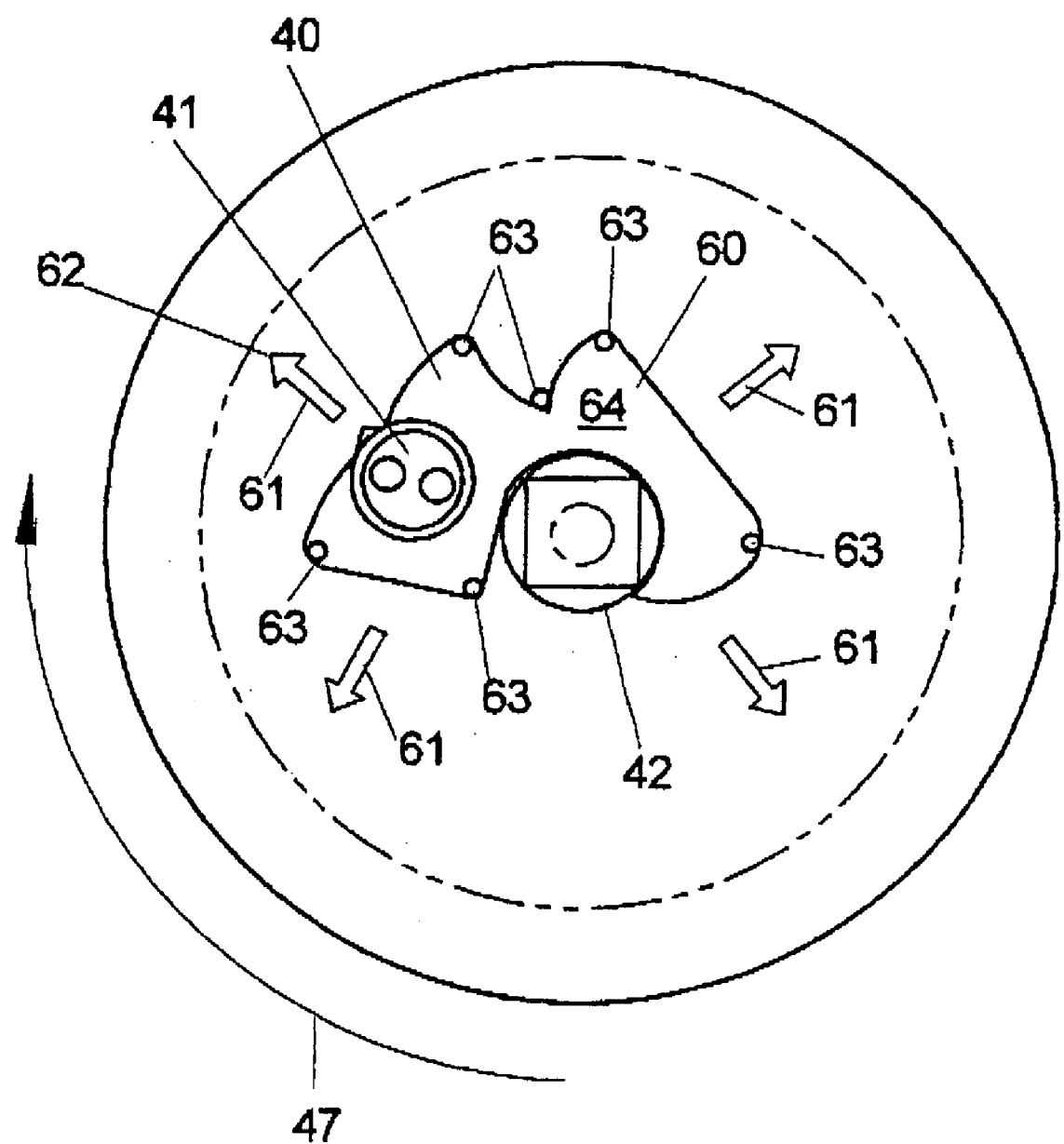
FIG. 6 schematically shows the spindle drive of the belt-buckle tightener from FIGS. 4 and 5.

FIG. 6 shows a more precise illustration of the pyrotechnic drive which is integrated in the spindle 11. As already mentioned, the spindle 11 is mounted rotatably on the coupling sleeve 42. To drive the spindle 11, a metal belt 60, which preferably consists of steel, is fastened (attached) at both ends to the coupling sleeve 42. The metal belt 60 runs around the gas generator 41; in the inoperative state, a remaining part of the metal belt 60 is stored, i.e. wound up, on the coupling sleeve 42. In addition, part of the metal belt 60 is guided around guide elements 63, thereby forming a space 64 into which the gas produced by the gas generator 41 flows and acts upon the metal belt 60.

If the gas generator 41 is ignited, the expanding combustion gas acts upon that part of the metal belt 60 which runs around the gas generator 41 and the guide elements 63, and moves said part radially outwards, as indicated by arrows 61. In this process, that part of the metal belt 60 which is stored on the coupling sleeve 42 is unwound from the latter. This produces a driving torque which causes the rotatably mounted spindle 11 to rotate.

The gas-permeable casing surface of the spindle 11 delimits, by means of its inner side, the maximum, theoretically possible expansion volume of the combustion chamber 40, as shown by the reference number 62. As FIGS. 4 and 5 show, the draw-in cable 12 is fastened to the outer side of the gas-permeable casing surface of the spindle 11. The ignition of the gas generator 41 and the resulting rotation of the spindle 11 causes the draw-in cable 12 to be wound onto the spindle 11. Since the draw-in cable 12 is connected to the belt buckle 1, the latter is tightened in a translatory manner towards the vehicle floor.

The locking of the spindle 11 against an oppositely directed rotation after the tightening process takes place by means of the latch 46 which engages in the toothing 45, as illustrated in FIGS. 4 and 5.

FIG. 7 shows a more precise illustration of the coupling sleeve 42. On its circumference, the coupling sleeve has a fastening region 70 for attachment of the metal belt 60. Along its longitudinal axis, the coupling sleeve 42 comprises three sections: a cylindrical central section 71 runs between the base areas of the spindle 11 and is used for attachment of the metal belt 60. This central section 71 runs between cylindrical sections 72 which serve for rotatable mounting (reference number 73) of the spindle 11 on the coupling sleeve 42. The outside diameter of the sections 72 corresponds essentially to the diameter of corresponding, circular cutouts 74 in the spindle 11. The outside diameter of the sections 72 is smaller than that of the central section 71, as a result of which an axial displacement of the spindle 11 relative to the coupling sleeve 42 is prevented.

At the axially outer ends of the coupling sleeve, end sections 75 adjoin the cylindrical sections 72. The end sections 75 have a square base area for accommodation in corresponding, square cutouts 76 in the frame 43. As a result, the coupling sleeve 42 is mounted in a rotationally fixed manner in the frame 43. The base area of the end sections 75 and the corresponding cutouts in the frame 43 may also have any other desired angular shape. It is essential for the shape to produce a rotationally fixed mounting.

Furthermore, the coupling sleeve 42 has holes 77 with a thread 78 in the end sections 75 and in the cylindrical sections 72. These holes 77 with threads 78 are used for screwing the coupling sleeve 42 to the frame 43, as illustrated in FIG. 5.

The priority application, German Patent Application Nos. 102 41 623.0 and 102 58 479.6 filed on Sep. 4, 2002 and Oct. 12, 2002, respectively, are hereby incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A belt-buckle tightener for a seat belt system in a vehicle, comprising:
    a rotatable spindle which is connected to a belt buckle via a draw-in cable; and
    a drive for rotation of the spindle, wherein the spindle and draw-in cable are arranged so that rotation of the spindle results in the draw-in cable being rolled up on the spindle and movement of the belt buckle in a direction that tightens the seat belt, the drive being integrated in the spindle; and
    a coupling sleeve which is connected in a rotationally fixed manner to a frame of the vehicle chassis,
    wherein the spindle is mounted rotatably on the coupling sleeve, and the drive includes a gas generator fastened to the spindle and a driving belt fastened at both ends to the coupling sleeve, and
    wherein the driving belt is partially wound up on the coupling sleeve and runs around the gas generator when the belt-buckle tightener is not operating, to form a space for receiving gas which is produced by the gas generator so that when gas from the gas generator enters the space the space is enlarged and the driving belt is unwound from the coupling sleeve, thereby producing a driving force and causing the spindle to rotate.

2. The belt-buckle tightener according to claim 1, wherein the driving belt is fixed only at both ends of the driving belt.

3. The belt-buckle tightener according to claim 1, wherein the driving belt also runs around one or more guide elements.

4. The belt-buckle tightener according to claim 1, wherein the coupling sleeve has a longitudinal axis and includes: a cylindrical central section having cylindrical subsections connected thereto, and end sections which have a rectangular cross-section, wherein the spindle is mounted on the subsections of the coupling sleeve, and the end sections are each retained in cutouts in the frame.

5. The belt-buckle tightener according to claim 4, the central section having a larger diameter than the subsections.

6. The belt-buckle tightener according to claim 4, the end sections and the subsections having threaded holes for receiving screws for fastening the coupling sleeve to the frame.

7. The belt-buckle tightener according to claim 1, the spindle being coupled to a blocking device which blocks rotation of the spindle counter to the rolling-up direction of the draw-in cable and thereby prevents the draw-in cable from unrolling.

8. The belt-buckle tightener according to claim 7, the blocking device being formed by toothing located on the circumference of the spindle and a corresponding latch on the vehicle chassis, the toothing being positioned so that engagement with the latch only takes place when the spindle is rotated counter to the rolling-up direction of the draw-in cable.

9. The belt-buckle tightener according to claim 1, the spindle having a cutout for receiving an end section of the draw-in cable, the said cutout comprising two sections with different cross-sectional surfaces, so that a shoulder is formed in the cutout, and wherein the end section of the draw-in cable has a larger cross-sectional surface than the remainder of the draw-in cable, and the end section rests on the shoulder and prevents the draw-in cable from becoming detached from the spindle when the draw-in cable is subjected to a tensile load.

10. The belt-buckle tightener according to claim 9, the cutout extending across the diameter of the spindle.

11. The belt-buckle tightener according to claim 9, the cutout being formed by a radial hole in the spindle.

12. The belt-buckle tightener of claim 1, the draw-in cable runs over a deflection pulley provided on the belt buckle and is fastened at one end to the spindle and at the other end to the vehicle chassis.

* * * * *